(12) United States Patent
Travica

(10) Patent No.: US 10,562,577 B1
(45) Date of Patent: Feb. 18, 2020

(54) TRAILER FOR AN ALL-TERRAIN VEHICLE

(71) Applicant: Theodore Travica, Princeton, MN (US)

(72) Inventor: Theodore Travica, Princeton, MN (US)

( * ) Notice: Subject to any disclaimer, the term of this patent is extended or adjusted under 35 U.S.C. 154(b) by 0 days.

(21) Appl. No.: 16/056,953

(22) Filed: Aug. 7, 2018

(51) Int. Cl.
*B62D 63/06* (2006.01)

(52) U.S. Cl.
CPC ......... *B62D 63/061* (2013.01); *B62D 63/062* (2013.01)

(58) Field of Classification Search
CPC ..... B62D 63/061; B62D 63/062; B62D 63/06
USPC .................................. 280/656, 651, 652, 43
See application file for complete search history.

(56) References Cited

U.S. PATENT DOCUMENTS

| | | | | |
|---|---|---|---|---|
| 5,480,180 A | * | 1/1996 | Fuller | B62D 21/20 280/491.1 |
| 5,544,944 A | * | 8/1996 | Keech | B60P 1/24 280/482 |
| D376,564 S | | 12/1996 | Mishoe | |
| 6,378,893 B1 | * | 4/2002 | Jager | B62D 33/0207 280/401 |
| D469,388 S | | 1/2003 | Mighell | |
| 7,229,090 B2 | | 6/2007 | Cumbie | |
| 8,448,978 B2 | * | 5/2013 | Alvarino | B62D 63/061 280/638 |
| 8,505,932 B1 | * | 8/2013 | Piccirillo | B62B 5/0003 280/30 |
| D819,917 S | * | 6/2018 | Simpson | D34/12 |
| 2002/0195798 A1 | | 12/2002 | James | |
| 2006/0208462 A1 | | 9/2006 | Spence | |
| 2007/0120345 A1 | * | 5/2007 | Wang | B65D 88/12 280/656 |
| 2011/0198824 A1 | | 8/2011 | Markovich | |

FOREIGN PATENT DOCUMENTS

GB 2267468 A * 12/1993 ........... B62D 63/061

* cited by examiner

*Primary Examiner* — John D Walters

(74) *Attorney, Agent, or Firm* — Cramer Patent & Design, PLLC; Aaron R. Cramer

(57) ABSTRACT

A trailer for an all-terrain vehicle includes a deck, a hitch assembly, and a pair of wheels disposed beneath the deck. Each wheel is rotationally secured to a first receiver which nests within a larger second receiver disposed beneath the deck. About the peripheral edge of the deck are disposed a plurality of rectangular tether attachment points.

15 Claims, 4 Drawing Sheets

TRAILER FOR AN ALL-TERRAIN VEHICLE

RELATED APPLICATIONS

Not applicable.

FIELD OF THE INVENTION

The presently disclosed subject matter is directed to a trailer for an all-terrain vehicle.

BACKGROUND OF THE INVENTION

All-Terrain Vehicles or ATV's have enjoyed recent widespread popularity. They find use in almost all types of terrains from desert areas, wooded areas, and even use in frozen areas covered with snow. They can be used as part of one's job, for hunting, camping, search and rescue, general recreation or just plain fun. However, one shortcoming of ATV's is their lack of cargo hauling capability. Once the driver, perhaps a passenger, and a few small items are onboard, there is little room for anything else.

The market has responded to this need with ATV trailers, which, while they address the cargo hauling shortcomings, cause a few more of their own. First, the axle and undercarriage of the typical trailer are low the ground which limit their off-road ability, especially in heavy brush. Second, ATV's typically require transport to their area of intended use. This is usually via a truck or transport trailer, which does not provide adequate room for both the ATV and the ATV trailer.

Accordingly, there exists a need for a means by which a trailer that is pulled behind an ATV or similar vehicle, that addresses the above-mentioned shortcomings. The development of the collapsible cargo trailer for personal transport vehicle 10 fulfills this need.

SUMMARY OF THE INVENTION

The principles of the present invention provide for a collapsible cargo trailer, comprising a trailer platform which is supported by a plurality of tires, the trailer platform is connected to a tow vehicle by a hitch arm. Each of the tires is connected to a bearing arm which in turn is physically attached to a vertical wheel support while each of the vertical wheel supports slides into a receiving tube. The collapsible cargo trailer also comprises an exterior frame rail which is provided with the trailer platform. The exterior frame rail supports a plurality of removable sides. The collapsible cargo trailer also comprises a pair of side pockets which is disposed on each side of the exterior frame rail to hold the vertical side supports, a plurality of fore/aft braces and a side/side center brace. The plurality of fore/aft braces and the side/side center brace provide a mid-span structure across the exterior frame rail to support the trailer platform. The hitch arm travels underneath the exterior frame rail and bisects the platform to terminate at the side/side center brace. The hitch arm is also pivotally attached to the side/side center brace via a removable pivot device affixed to a first pair of brackets and a second pair of brackets. The first pair of brackets and the second pair of brackets are affixed to the exterior frame rail where the hitch arm extends away from the platform.

The collapsible cargo trailer may also comprise a width of the trailer platform which is not to exceed a width of the tow vehicle while the receiving tube may have an internal opening 3/16 inch larger than an exterior dimension of the vertical wheel support. The vertical wheel support may be held captive in the receiving tube by a retaining device. The retaining device may be selected from a group consisting of a pin with a clip, a bolt or a nut, or a quick release spring.

The trailer platform may be 3 feet wide and 5 feet long and may be made of exterior grade plywood. The trailer platform may also comprise aluminum plate. The towing vehicle may be selected from a group consisting of a snow mobile, a small tractor, a riding mower, a dirt bike, or a bicycle. The vertical wheel support may comprise tubular steel.

The vertical side supports may be held in place to the side pockets by use of friction fit while the removable sides are selected form a group consisting of open frame members, closed side screen material, closed side exterior grade plywood, or closed side exterior grade wood.

A removable securing pin may be utilized to retain the hitch arm from dropping due to gravity and the second pair of brackets depend downward more than the first pair of brackets. The trailer platform may pivot backwards with the removable pivot device in place and the securing pin removed. The receiving tubes may be positioned along the side/side center brace to provide structural support to the collapsible cargo trailer.

The collapsible cargo trailer may be disassembled which may include removal of the tires by separating the vertical wheel support from the receiving tube, removal of all removable sides from the side pockets and removal of the securing pin from the second pair of brackets, thereby permitting rearward rotation of the hitch arm via the removable pivot device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
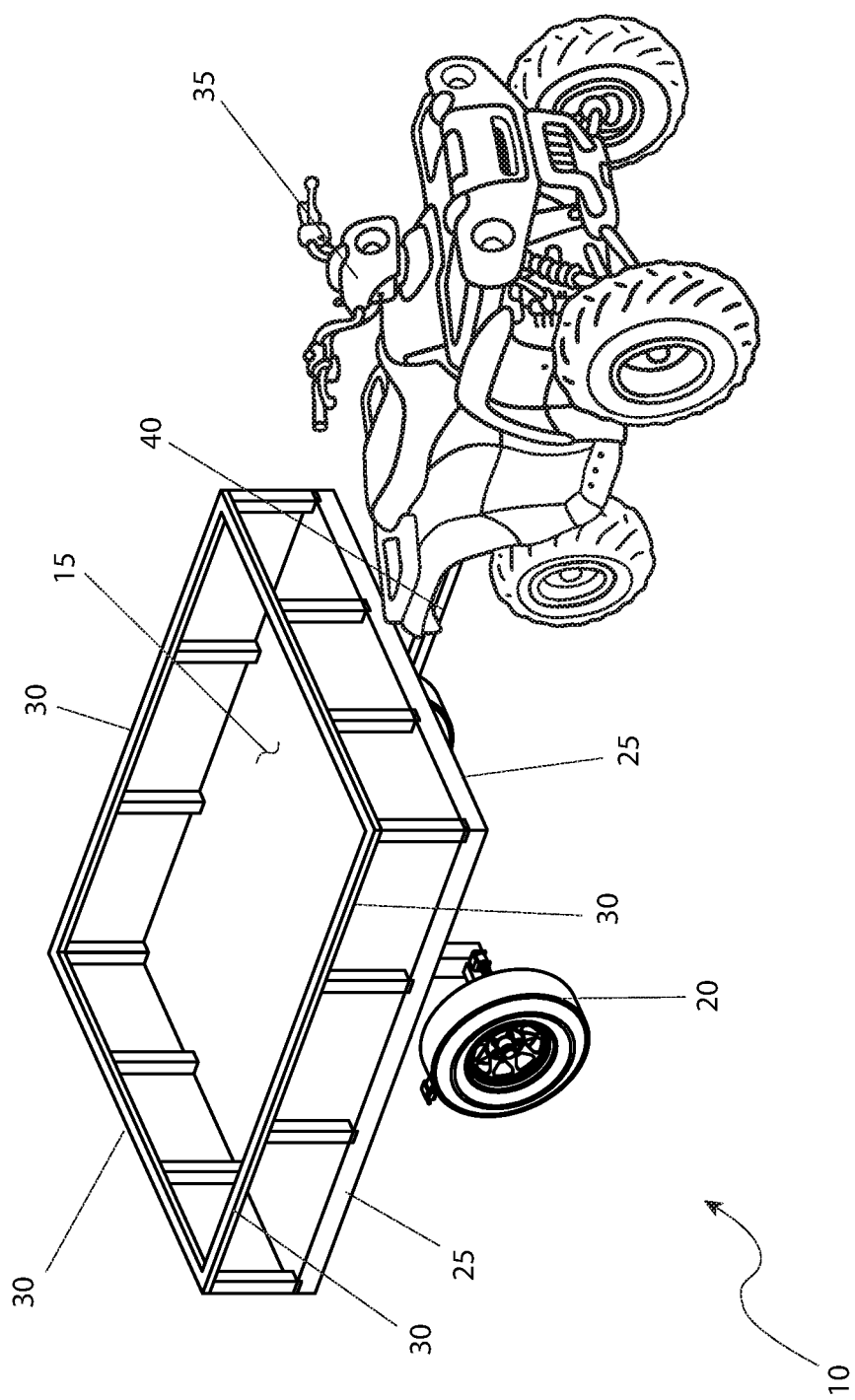
FIG. 1 is a perspective view of the collapsible cargo trailer 10, shown in a utilized state, according to the preferred embodiment of the present invention.

DESCRIPTIVE KEY 10 collapsible cargo trailer
15 trailer platform
20 tires
25 exterior frame rail
30 removable side
35 tow vehicle
40 hitch arm
45 side pocket
50 vertical side support
55 bearing arm
60 vertical wheel support
65 receiving tube 70 retaining device
75 open area
85 side/side center brace
90 fore/aft bracing
95 removable pivot device
99a first bracket
99b second bracket
100 securing pin
105 hitch coupling
110 transport trailer
115 road transport vehicle

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the collapsible cargo trailer 10, shown in a utilized state, according to the preferred embodiment of the present invention is disclosed. The collapsible cargo trailer 10 (herein also described as the "device") 10, includes a trailer platform 15 supported by two (2) tires 20 (only which one (1) is shown due to illustrative limitations. The trailer platform 15 can vary in size depending on need, but is envisioned to be approximately three feet (3 ft.) wide and five feet (5 ft.) long. However, the overall width of the platform 15 is not to exceed the overall width of a tow vehicle 35, which is typically forty-eight inches (48 in.). It is provided with an exterior frame rail 25 that supports a series of four (4) removable sides 30. It is envisioned that the exterior frame rail 25 would be made of channel or tubular metal material such as steel or aluminum, or angle iron. The trailer platform 15 would be manufactured from exterior grade plywood, aluminum plate or other suitable material that is structurally and physically strong while being light weight. The exact materials of construction are not intended to be a limiting factor of the present invention.

The trailer platform 15 is connected to a tow vehicle 35 by a hitch arm 40. The tow vehicle 35 is depicted as an All-Terrain Vehicle (ATV) for purposes of illustration, however other types of tow vehicle 35 such as snow mobiles, small tractors, riding mowers, dirt bikes, and even bicycles could be utilized with the teachings of the present invention. As such, the user of the device 10 with any particular type of tow vehicle 35 should not be interpreted as a limiting factor of the present invention. The removable sides 30 are depicted as open frame members, however closed sides, such as screen material, exterior grade plywood, exterior grade wood, or the like may also be utilized without being a limiting factor of the present invention. Any items placed on the trailer platform 15 would be secured by use of ratcheting straps, elastic straps, rope, cord, elastic nets, tarpaulins, or the like. The device 10 would be used to transport supplies, equipment, and materials to areas normally frequented by the tow vehicle 35. Such usage includes but is not limited to: farming equipment on a farm, hunting supplies to a hunting site, camping supplies and equipment to a remote camping site not served by paved roadways, fishing supplies to a remote fishing site, construction equipment and supplies to a building site or the like. The functionality of the device 10 provides the tow vehicle 35 with additional cargo carrying ability without affecting the stability of the tow vehicle 35 or distracting the operator.

Figure 2:
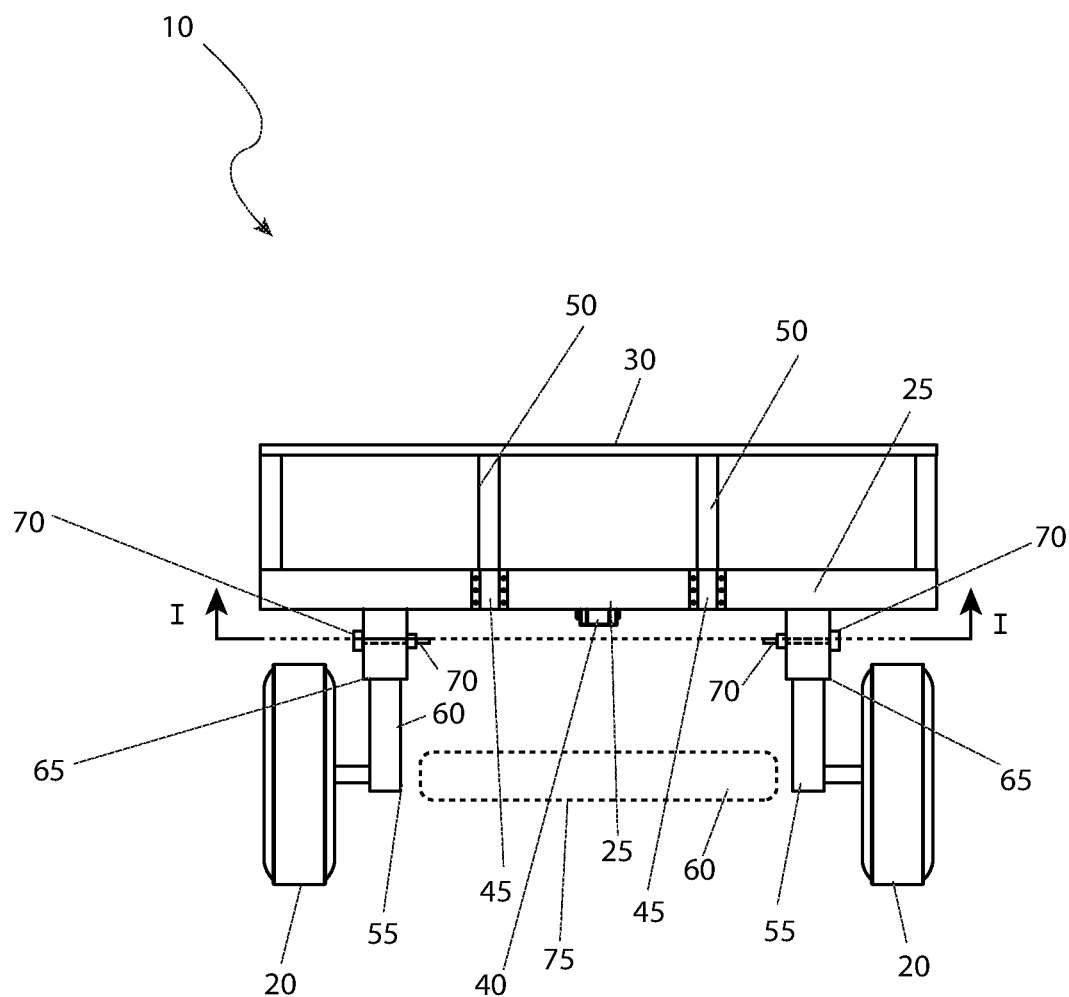
FIG. 2 is a rear view of the collapsible cargo trailer 10, according to the preferred embodiment of the present invention.

Referring next to FIG. 2, a rear view of the device 10, according to the preferred embodiment of the present invention is depicted. This figure depicts the exterior frame rail 25 serving as the main structural element for the device 10. Two (2) side pockets 45 on each side of the exterior frame rail 25 (total of eight (8) side pockets 45 on the device 10) are used to hold vertical side supports 50 provided as part of the removable sides 30. The vertical side supports 50 are held in place to the side pockets 45 by use of friction fit. Each tire 20 is connected to a bearing arm 55 which in turn is physically attached to a vertical wheel support 60 envisioned to be made of tubular steel. The tires 20 may be pneumatic, solid, solid fill, or other style. The use of any particular style of tires 20 is not intended to be a limiting factor of the present invention. Each vertical wheel support 60 then slides into a receiving tube 65 whose internal opening is envisioned to be approximately three-sixteenths of an inch (3/16 in.) larger than the exterior dimensions of the vertical wheel support 60. The vertical wheel support 60 is then held captive in the receiving tube 65 by use of a retaining device 70 such as a pin with clip, bolt or nut, quick release spring, or the like. The use of any particular style of retaining device 70 is not intended to be a limiting factor of the present invention. It is noted that the hitch arm 40 is also visible in a central location. These features afforded by the bearing arm 55, the vertical wheel support 60 and the receiving tube 65 eliminate a central axle as is common on most styles of similar cargo trailers and thus affords an open area 75 on the underside of the device 10 resulting in increased ground clearance and a corresponding increase in ability to traverse rough grade and heavy brush.

Figure 3:
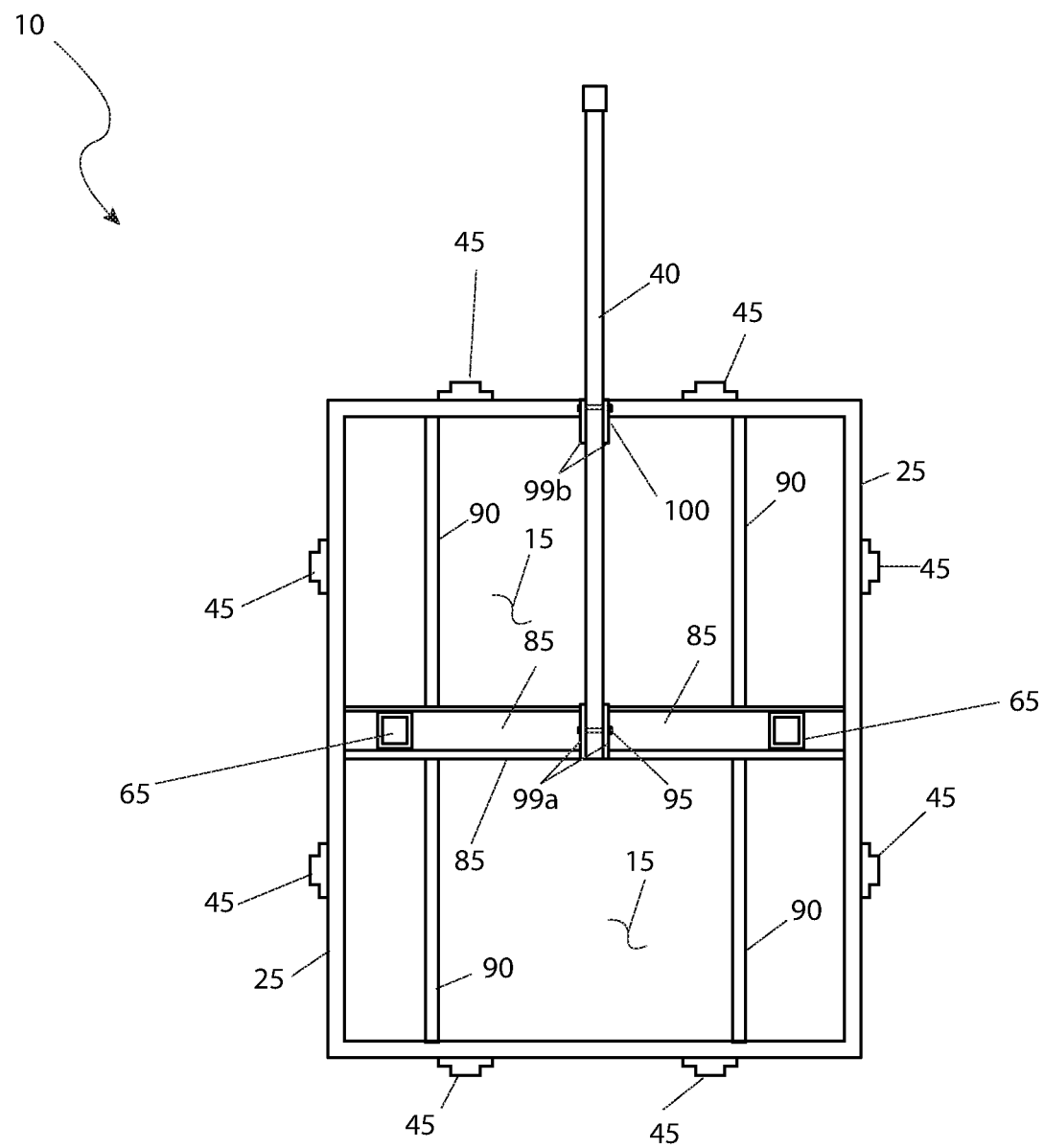
FIG. 3 is a section view of the collapsible cargo trailer 10, as seen along a line I-I, as shown in FIG. 2, according to the preferred embodiment of the present invention; and, FIG. 4 is a perspective view of the collapsible cargo trailer 10, shown in a stowed position on a transport trailer 110, according to the preferred embodiment of the present invention.

Referring now to FIG. 3, a section view of the device 10, as seen along a line I-I, as shown in FIG. 2, according to the preferred embodiment of the present invention is shown. This view clearly depicts the underside or undercarriage of the device 10. The exterior frame rail 25 provides the perimeter structural element. A plurality of fore/aft braces 90 and a side/side center brace 85 provide mid-span structure across the exterior frame rail 25 to support the trailer platform 15. The hitch arm 40 travels underneath the exterior frame rail 25 and bisects the platform 15 to terminate at the side/side center brace 85. This terminal point is pivotally attached to the side/side center brace 85 via a removable pivot device 95 affixed to a first pair of brackets 99a. A second pair of brackets 99b is affixed to the exterior frame rail 25 at the location where the hitch arm 40 extends away from the platform 15. A removable securing pin 100 is utilized to retain the hitch arm 40 from dropping due to gravity. As such, the second pair of brackets 99*b* depend downward more than the first pair of brackets 99*a*. Both the removable pivot device 95 and the securing pin 100 are envisioned to be pins with retention clips, although other devices can be utilized with equal effectiveness. With the removable pivot device 95 in place and the securing pin 100 removed, the trailer platform 15 may pivot backwards allowing the trailer platform 15 to dump carried loads such as gravel, dirt, mulch, and the like.

The receiving tubes 65 are positioned along the side/side center brace 85 in a manner which provides structural support to the device 10 as shown in FIG. 2. The distal end of the hitch arm 40 is provided with a hitch coupling 105. The hitch coupling 105 can be any type of hitch including but not limited to: a ball hitch, a pintle hook, lunette ring, or the like. The particular style of hitch used with the device 10 is not intended to be a limiting factor of the present invention. The eight (8) side pockets 45 are visible along the exterior side of the exterior frame rail 25.

Figure 4:
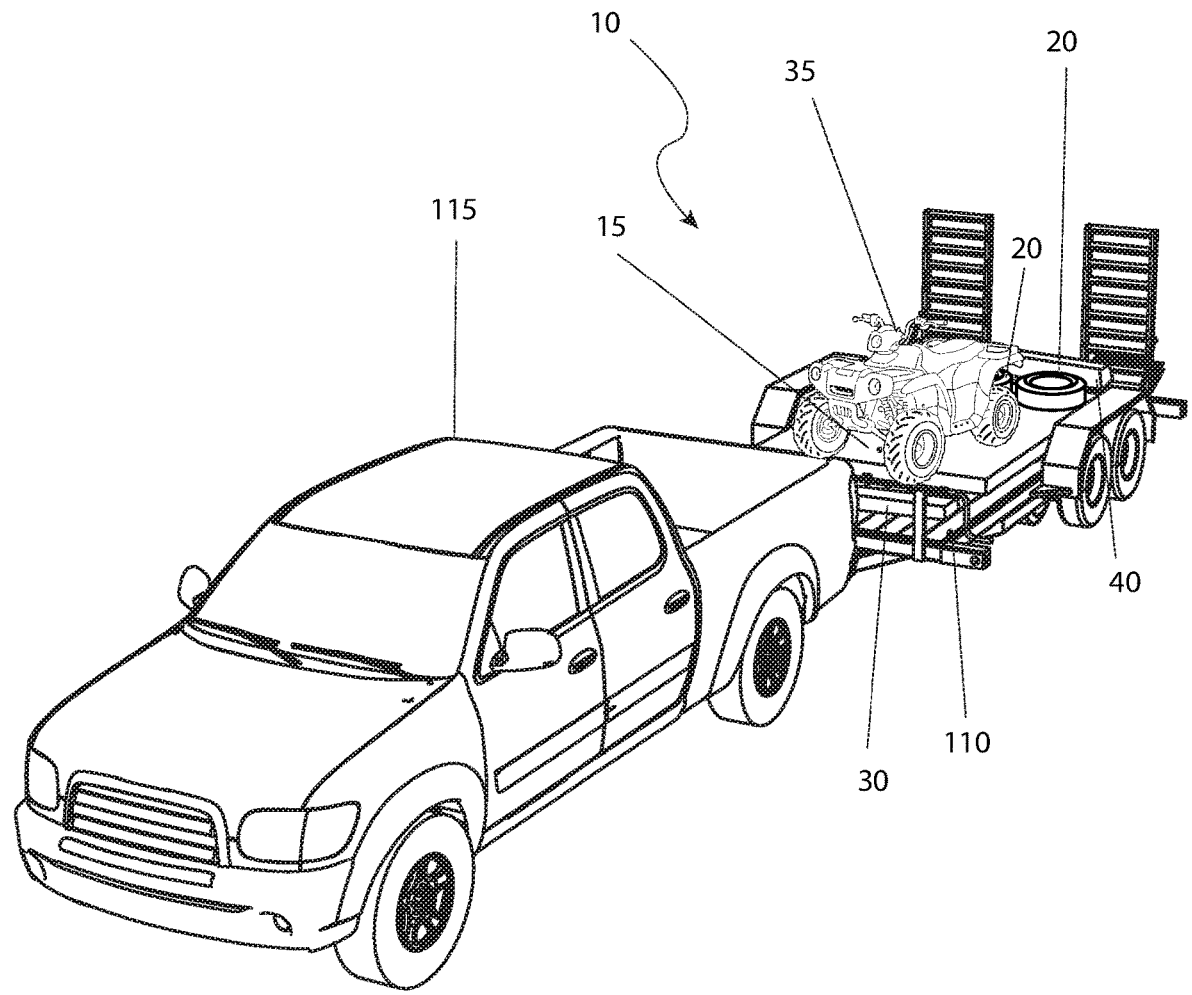

Referring finally to FIG. 4, a perspective view of the device 10, shown in a stowed position on a transport trailer 110, according to the preferred embodiment of the present invention is disclosed. The transport trailer 110 is a standard trailer assembly used to transport the tow vehicle 35 behind a road transport vehicle 115, herein depicted as a pickup truck. The device 10 is disassembled including removal of the tires 20 by separating the vertical wheel support 60 (as shown in FIG. 2) from the receiving tube 65 (as shown in FIG. 2), and removal of all removable sides 30 (as shown in FIG. 2), from the side pockets 45 (as shown in FIG. 3), and removal of the securing pin 100 from the second pair of brackets 99*b*, thereby permitting rearward rotation of the hitch arm 40 via the removable pivot device 95. The removed components (including but not limited to: the tires 20, the removable sides 30, and the hitch arm 40 and exterior frame rail 25) can be placed on the transport trailer 110 as shown or in another suitable location such as the bed of the road transport vehicle 115. As such, the transport of the device 10 to a remote usage site can be easily accomplished without necessitating any additional storage space, by the placement of the trailer platform 15 directly underneath the tow vehicle 35. Placement of the components of the device 10 onto the transport trailer 110 can occur in any manner, as is the case with the tow vehicle 35.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 paying particular regard to factors such as overall size, type and style of removable sides 30, style of hitch coupling 105, type of tow vehicle 35 and type of transport trailer 110 the device 10 is to be used with and the like.

After procurement and prior to utilization, the device 10 would be prepared in the following manner: with the trailer platform 15 in an inverted (upside down) manner, each vertical wheel support 60 is inserted into the respective receiving tube 65 and secured with the retaining device 70; if needed, the hitch arm 40 is pivotally secured to the side/side center brace 85 with the removable pivot device 95 and retained to the exterior frame rail 25 with the securing pin 100; the assembly 10 inverted; and if desired, the removable sides 30 are inserted into the side pockets 45.

During utilization of the device 10, the following procedure would be initiated: the hitch coupling 105 would be coupled to the tow vehicle 35 such as an ATV in a normal manner; cargo consisting of equipment, materials, supplies or the like are secured in the trailer platform 15; and travel is initiated to a destination.

After use of the device 10, it is disassembled; stowed in an inverted manner on the transport trailer 110; the tow vehicle 35 driven onto the trailer platform 15, the tow vehicle 35 secured, the removable sides 30, the hitch arm 40/exterior frame rail 25/platform 15 assembly, and the tires 20 placed on the transport trailer 110 (or other suitable transport location) and secured. Transport of the tow vehicle 35 and the device 10 then occurs on roadways in a conventional manner. Repeated usage consisting of transport, deployment, usage of the device 10, stowage and subsequent transport can occur in a repeated, cyclical manner as needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A collapsible cargo trailer, comprising:
   a trailer platform supported by a plurality of tires, said trailer platform connected to a tow vehicle by a hitch arm;
   wherein each of said tires is connected to a bearing arm which in turn is physically attached to a vertical wheel support; and,
   wherein each of the vertical wheel supports slides into a receiving tube;
   an exterior frame rail provided with said trailer platform;
   wherein said exterior frame rail supports a plurality of removable sides;
   a pair of side pockets disposed on each side of said exterior frame rail to hold a vertical side supports;
   a plurality of fore/aft braces; and,
   a side/side center brace;
   wherein said plurality of fore/aft braces and said side/side center brace provide a mid-span structure across said exterior frame rail to support said trailer platform,
   wherein said hitch arm travels underneath said exterior frame rail and bisects said platform to terminate at said side/side center brace;
   wherein said hitch arm is pivotally attached to said side/side center brace via a removable pivot device affixed to a first pair of brackets and a second pair of brackets;
   wherein said first pair of brackets and said second pair of brackets are affixed to said exterior frame rail where said hitch arm extends away from said platform and,
   wherein a removable securing pin is utilized to retain said hitch arm from dropping due to gravity and said second pair of brackets depend downward more than said first pair of brackets, wherein said receiving tubes are located beneath said side/side center brace and within a perimeter edge of said trailer platform.

2. The collapsible cargo trailer according to claim 1, wherein a width of said trailer platform is not to exceed a width of said tow vehicle.

3. The collapsible cargo trailer according to claim 1, wherein said receiving tube has an internal opening 3/16 inch larger than an exterior dimension of said vertical wheel support.

4. The collapsible cargo trailer according to claim 1, wherein said vertical wheel support is held captive in said receiving tube by a retaining device.

5. The collapsible cargo trailer according to claim 4, wherein said retaining device is selected from a group consisting of a pin with a clip, a bolt or a nut, or a quick release spring.

6. The collapsible cargo trailer according to claim 1, wherein said trailer platform is 3 feet wide and 5 feet long.

7. The collapsible cargo trailer according to claim 1, wherein said trailer platform is made of exterior grade plywood.

8. The collapsible cargo trailer according to claim 1, wherein said trailer platform comprises aluminum plate.

9. The collapsible cargo trailer according to claim 1, wherein said towing vehicle is selected from a group consisting of a snow mobile, a small tractor, a riding mower, a dirt bike, or a bicycle.

10. The collapsible cargo trailer according to claim 1, wherein said vertical wheel support comprises tubular steel.

11. The collapsible cargo trailer according to claim 1, wherein said vertical side supports are held in place to said side pockets by use of friction fit.

12. The collapsible cargo trailer according to claim 1, wherein said removable sides are selected form a group consisting of open frame members, closed side screen material, closed side exterior grade plywood, or closed side exterior grade wood.

13. The collapsible cargo trailer according to claim 1, wherein said trailer platform pivots backwards with said removable pivot device in place and said securing pin removed.

14. The collapsible cargo trailer according to claim 1, wherein said receiving tubes are positioned along said side/side center brace to provide structural support to said collapsible cargo trailer.

15. The collapsible cargo trailer according to claim 1, wherein said collapsible cargo trailer is disassembled including removal of said tires by separating said vertical wheel support from said receiving tube, removal of all removable sides from said side pockets and removal of said securing pin from said second pair of brackets, thereby permitting rearward rotation of said hitch arm via said removable pivot device.

* * * * *